Sept. 11, 1923.

C. F. PEARSON 1,467,449

MACHINE ELEMENT

Filed Oct. 18, 1920

Inventor;
Carl F. Pearson
By Forée Bain & Hinkle
Attys.

Patented Sept. 11, 1923.

1,467,449

UNITED STATES PATENT OFFICE.

CARL F. PEARSON, OF CHICAGO, ILLINOIS, ASSIGNOR TO CHICAGO MACHINE & MOTOR CO., A CORPORATION OF ILLINOIS.

MACHINE ELEMENT.

Application filed October 18, 1920. Serial No. 417,659.

*To all whom it may concern:*

Be it known that I, CARL F. PEARSON, a citizen of the United States, residing at Chicago, in the county of Cook and State of Illinois, have invented certain new and useful Improvements in Machine Elements, of which the following is a specification.

This invention relates to machine elements.

It is particularly applicable for use in pulleys, gear wheels and similar devices.

One of the objects of the invention is to provide a pulley, or the like, which is simple of construction and reliable in operation.

Another object is to provide an improved "loose" or "idler" pulley.

Another object is to reduce the friction in an idler pulley.

Another object is to provide an anti-friction loose pulley with a reduced number of parts.

Another object is to provide an improved anti-friction bearing for idler pulleys and the like, wherein the balls cooperate to hold the bearing members together as a unit.

Other objects and advantages will hereinafter appear.

An embodiment of the invention incorporated in an idler pulley is illustrated in the accompanying drawing wherein—

Figure 1:
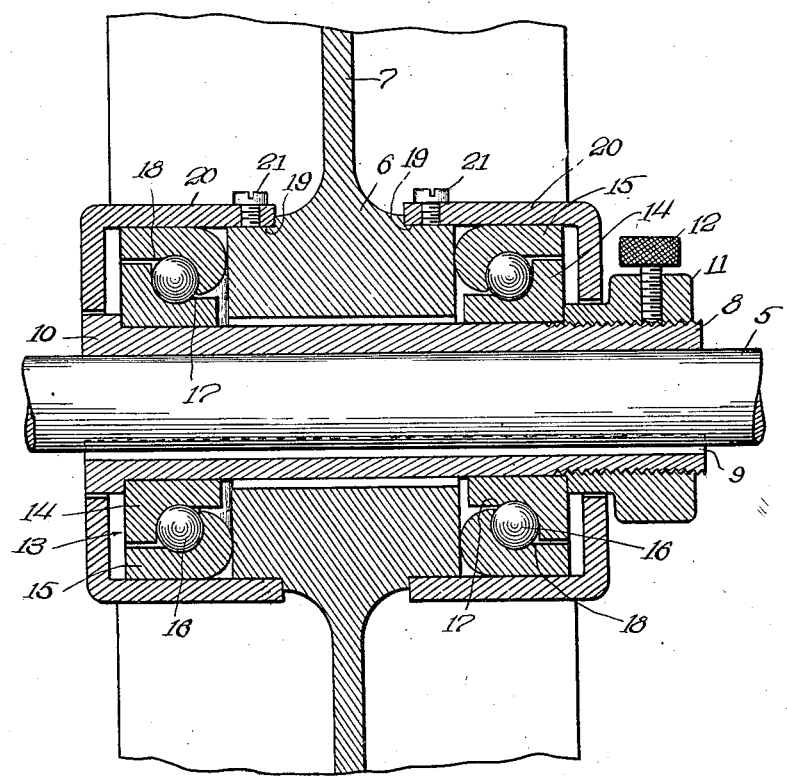
Fig. 1 is a longitudinal section thru the pulley.

The pulley illustrated is a "loose" or "idler" pulley; that is, a pulley which does not rotate or is not rotated by the shaft upon which it is mounted. Idler pulleys are extensively used in machine operation in cooperation with a driving pulley, which is usually fixed to the shaft adjacent the idler pulley. The driving belt is moved by suitable means from the driving pulley to the idler pulley to stop the machine.

The pulley is mounted upon a shaft 5 but the rotation of one does not rotate the other.

The pulley has a hub with a central portion 6 which is interconnected to the periphery by suitable means such as a web 7. Central portion 6 surrounds, but is spaced away from a sleeve 8.

Sleeve 8 is rigidly secured to shaft 5 by any suitable means, such for example, as a key 9.

Sleeve 8 has an annular shoulder 10 adjacent one end and is exteriorly threaded at its other end to receive a threaded adjusting nut 11 which forms a corresponding shoulder on the other end. Nut 11 is held in any desired position by a locking thumb screw 12.

On each side of the central portion of the hub, and locked against shoulder 10, and the shoulder provided by the inner end of nut 11 and the respective sides of the central portion of the hub, are anti-friction bearings 13.

Figure 2:
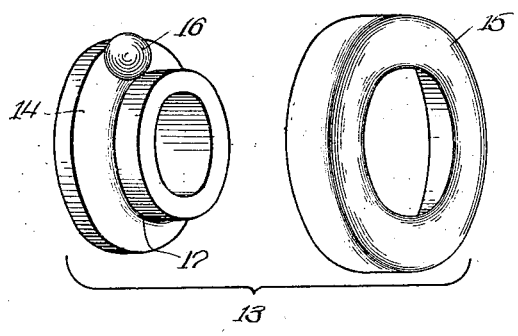
Fig. 2 is a separated perspective of the elements of the anti-friction bearing.
Figure 3:
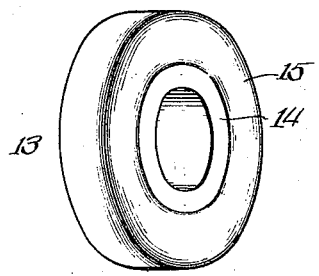
Fig. 3 is a perspective of the anti-friction bearing assembled.

Figs. 2 and 3 illustrate the construction of these bearings.

Each bearing comprises a cone 14 and an annular cup 15 between which are located hardened balls 16.

The ball engaging surface at the base of the cone is made substantially on the arc of a circle. The upper edge of the arc is extended to provide a small annular shoulder 17.

The ball engaging surface of the cup is similarly formed to provide a small annular shoulder 18.

The outside diameter of cone 14 at shoulder 17 is greater than the diameter at the bottom of the ball groove therein while the inside diameter of cup 15 at shoulder 18 is less than the diameter at the bottom of ball groove therein.

The bearing is assembled by placing enough balls on the engaging surface of the groove or race of the cone or in the race or groove of the cup to prevent the cup and cone from being moved together without momentarily distorting the cup slightly. Ordinarily there will be enough balls when the race is substantially filled. Then the cup is forced into position. The cup in being forced into position is slightly and momentarily expanded to allow its shoulder to snap over the line of balls. When the shoulder has passed beyond the diameter of the balls the cone and cup can not be easily separated. Thus the balls co-operate with the shoulders on the cup and cone, to hold the three elements together to form a simple, easily assembled, self-sustaining unit, such as shown in Fig. 3.

Each upper outer edge of the central portion 6 of the hub is provided with an annular ledge 19 which forms a seat for a suitable annular cap 20. Each cap 20 is secured to its respective side of the central portion of the hub by a set screw 21. These caps serve to cover and protect the bearings and, resting upon their respective bearings, hold the pulley in position, wherein its axis always corresponds to the axis of the shaft. The hub of the pulley is thus formed of three parts or elements—the central portion 6 and the two caps 20—and is journaled on the sleeve over the shaft by anti-friction bearings at each end.

When the bearing becomes loosened by wear or for any other reason a tighter adjustment is desired, nut 11 may be turned to shorten the distance between shoulder 10 and the shoulder formed by the end of the nut, or in other words, to shorten the effective length of the sleeve. Such an adjustment may be retained by tightening set screw 12. The adjustment may be loosened by rotating nut 11 in the reverse direction to lengthen the distance between the shoulders or the effective length of the sleeve.

Having described my invention what I claim as new and desire to secure by Letters Patent is:—

1. Apparatus of the character described having in combination a sleeve to be rigidly secured to a shaft; a three-part hub rotatably carried by the sleeve, two parts being removable; an anti-friction bearing located at each end of the structure, said removable parts overlying and supporting the respective outer rings of the bearings and means to vary the effective length of the sleeve to adjust the relation between the bearings and the hub.

2. A pulley having a sleeve to be rigidly secured to a shaft, a three part hub rotatably carried by the sleeve, two of said parts being removable, an anti-friction bearing interposed between each end of the sleeve and the removable parts of the hub, said removable parts overlying and supporting the respective outer rings of the bearings, and a take up for varying the effective length of the sleeve to adjust the relation between the bearings and hub.

3. A pulley having a sleeve provided with a shoulder at each end, a hub rotatably carried by the sleeve and located between the shoulders thereof, said hub having a central portion and two removable end caps, an anti-friction bearing positioned between each end cap of the hub and the respective shoulder on the sleeve, the outer ring of the bearings supported by the respective caps, and means for adjusting the distance between the shoulders on the sleeve to vary the relation between the sleeve and hub.

4. A pulley having a sleeve to be rigidly attached to a shaft and provided with a shoulder adjacent each end, one of the shoulders being adjustably movable and the other being fixed; a hub having a central portion and two removable end caps; and an anti-friction bearing within each end cap for supporting the hub on the sleeve and both being simultaneously adjustable by movement of the movable shoulder.

In testimony whereof I hereunto subscribe my name.

CARL F. PEARSON.